June 30, 1953 R. A. RAMEY 2,644,129

SEPARATE MAGNETIZATION OF MAGNETIC AMPLIFIERS

Filed Dec. 27, 1950

INVENTOR
ROBERT A. RAMEY

BY D. B. Snyder
Howard White
ATTORNEYS

Patented June 30, 1953 2,644,129

UNITED STATES PATENT OFFICE 2,644,129

SEPARATE MAGNETIZATION OF MAGNETIC AMPLIFIERS

Robert A. Ramey, Washington, D. C.

Application December 27, 1950, Serial No. 202,999

4 Claims. (Cl. 323—89)

(Granted under Title 35, U. S. Code (1952), sec. 266)

This invention relates in general to saturable core reactors and in particular to the reduction of the residual magnetizing current of a magnetic amplifier.

Magnetic amplifiers have been known for a number of years during a greater part of which time little advancement has been made. The primary reason for the virtual discarding of magnetic amplifiers was the belief that thermionic amplifiers were far superior in all respects, and consequently thermionic amplifiers had raced ahead of magnetic amplifiers in development. Vacuum tubes are, however, a very undesirable component in certain systems and particularly in warfare equipment, especially where reliability and ruggedness are essential. This fact was brought out late in the last war, where it became evident that magnetic amplifiers could be used to good advantage in many places where vacuum tubes were previously thought to be necessary. Developments in other electrical fields produced high permeability magnetic alloys and dry-type rectifiers; materials that could be applied with great advantage to magnetic amplifier techniques to enhance the present day development of magnetic amplifiers.

In the present day electrical system, magnetic amplifiers find utility as a sensitive robust galvanometer; a pre-amplifier for an electronic amplifier when the incoming signal is direct current thereby functioning as a D. C.-A. C. converter; as a mixing device and amplifier in a series system; speed and frequency regulators; instrument amplifiers; to drive and control the reversal of an A. C. or D. C. motor; and probably of most importance to drive a motor at a speed dependent on the value of the input signal. Other uses for magnetic amplifiers are, of course, known.

The magnetic amplifier, however, is in a sense still in the developmental stage since all of its capabilities are not fully appreciated and further known magnetic amplifiers have shortcomings and limitations that also require further development. One of these limitations is the problem confronted with the performance ability versus expense of the cores with respect to their composition and structure.

In the field of magnetic amplifiers, for instance of such limitation, the most commonly used core structure is the shell type iron, or as it is usually known the three legged reactor. With this and other commonly used cores there generally exists the problem of the introduction of an air gap. Even a small air gap in the magnetic circuit will reduce the A. C. permeability greatly and waste a great deal of polarizing ability. The introduction of a gap introduces a high residual magnetizing current which when flowing through the load, masks the effects of the control current. This problem is especially serious when the magnetic amplifier is employed in a circuit where it is essential to have no current flow when no control voltage is applied, which is not the case if a residual magnetizing current exists.

A major problem then, in the design of magnetic amplifiers, is to provide a core with no air gap. The solution to this problem has not been met with a great deal of success. It has been found that the type of core which gives the least air gap is the toroidal-type core consisting of a continuous strip of alloy steel. The toroidal-type core, however, has also proven to have a serious disadvantage i. e., the extreme difficulty encountered in the winding of the coils thereon. This winding process is extremely complex and often by hand and quite expensive for a production basis.

The present invention is a solution for overcoming the above mentioned undesirable effects of air gaps encountered through the use of conventional type of cores. The solution of this problem permits the use of well known types of cores with the winding of the coils thereon by conventional techniques. In other words the present invention solves the problem of air gaps in cores by counteracting the above mentioned residual magnetizing current.

It is accordingly an object of the present invention to provide an improved magnetic amplifier of inexpensive construction.

A further object of the present invention is to provide a magnetic amplifier using the conventional type of cores, but nevertheless relatively free of the disadvantages normally inherent therein.

Another object of the present invention is to reduce to substantially zero the quiescent current flow through a magetic amplifier.

Further objects and attainments of the present invention will become apparent from the following detailed description when taken in conjunction with the drawings in which.

In accordance with the spirit and scope of the present invention means are incorporated in a magnetic amplifier to counteract the high residual magnetizing current, as previously explained, caused principally by air gaps that exist in the conventional type of magnetic core. The high residual magnetizing current that masks the effects of the control current is counteracted by causing an additional magnetizing current of equal ampere-turns value to flow through a separate coil not necessarily connected electrically to the output circuit.

Briefly, this separate coil comprises a pair of windings positioned in adjacent relationship to the load winding and having a relatively few number of turns. This separate winding is energized with an amount of alternating current determined by the value necessary for normal magnetization.

Figure 1:
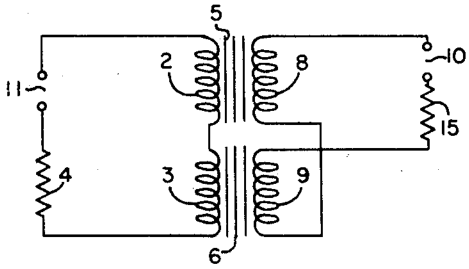
Fig. 1 is a schematic diagram of a conventional magnetic amplifier.

The operation of magnetic amplifiers is well known in the art and is the subject of many publications. However, to assist in understanding the function of the present invention it may be best to give a simple explanation of the operation of a conventional magnetic amplifier such as shown in Fig. 1, to which reference may now be had. Saturable core reactors, as magnetic amplifiers are sometimes known, are the actual transformer-like structures such as shown in Fig. 1 comprised of the power windings 2 and 3, and control windings 8 and 9 connected in opposition to each other, the windings being wound over conventional laminated iron cores 5 and 6.

The load to be controlled, represented by resistor 4, is connected in series with windings 2 and 3 to a suitable alternating current energizing source applied to terminals 11. The impedance offered by windings 2 and 3 is controlled from a direct current control voltage applied in series with windings 8 and 9 from terminals 10.

The alternating current of load windings 2 and 3 act in unison whereas the D. C. windings 8 and 9 are wound in opposition to each other. In this way although the A. C. voltage appears across the individual D. C. coils 8 and 9, the transformer action thus balances out the fundamental A. C. voltage at terminals 10.

With no direct current applied to terminals 10, the alternating current circuit reduces to the simple case of two inductances in series. Each core will carry an equal pulsating flux, the magnitude and wave shape of the flux being dependent on the magnitude and wave shape of the applied A. C. voltage. If the applied alternating voltage is not so large as to produce a flux of an amplitude exceeding the saturation value each unit will have an infinite inductance (assuming the permeability is infinite) and no A. C. current will be drawn by load 4.

When a relatively large amount of direct current is applied to terminals 10 the core becomes saturated, the permeability decreases, inductance and consequently the reactance decreases and the A. C. current through windings 2 and 3 increases, allowing more A. C. power to be dissipated in the load 4.

Figure 2:
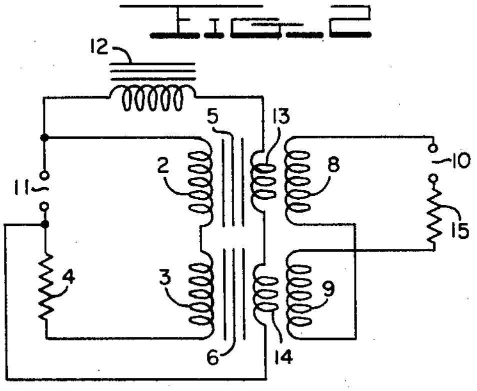
Fig. 2 is a schematic diagram of the conventional magnetic amplifier of Fig. 1 in which the features of the present invention are incorporated.
Figure 3:
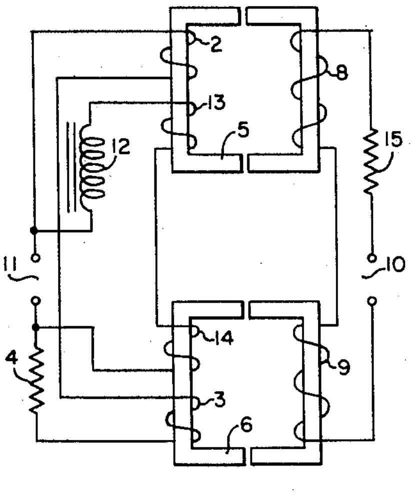
Fig. 3 is a diagram of the magnetic amplifier of Fig. 2 illustrating a physical relationship of the windings.

With reference to Figs. 2 and 3 there is illustrated the conventional magnetic amplifier of Fig. 1 having in addition thereto a preferred embodiment of the present invention. The magnetic amplifier shown in Figs. 2 and 3 functions in theory of operation, except as hereinafter explained, similar to the amplifier of Fig. 1, wherein the current across load resistance 4 is directly controlled by the amount of D. C. applied at terminals 10.

As previously stated, with the use of conventional inexpensive magnetic cores there generally will exist air gaps. The effect of the existence of these gaps is to cause a magnetizing current to flow through the load resistance. Accordingly, with a constant flow of magnetizing current, the quiescent current or the no load signal output current of the magnetic amplifier is never zero. To counteract this undesirable residual magnetizing current flow, that is to reduce the no load current flow of the magnetic amplifier to zero, additional coils 13—14 positioned in adjacent relationship to the load windings 2 and 3, as shown in Fig. 3, are added to the circuit. There is then permitted to flow in coils 13—14 current equal in ampere-turns value to the normal no load magnetizing current flow of the particular core employed, to balance and cancel the residual magnetizing current.

It is to be understood, of course, that numerous means are known for supplying a small alternating current to core 13—14. In the preferred embodiment, however, as a matter of expediency only, the amount of current flow through coil 13—14 is controlled by inductance 12 conveniently connected to the A. C. source. The size of inductance 12 is empirically chosen to permit a current flow through coils 13—14 of an amount equal in ampere-turns value to the residual magnetizing current. Coils 13—14 are shown as connected to the same source of alternating current that supplies coils 2 and 3.

Figure 4:
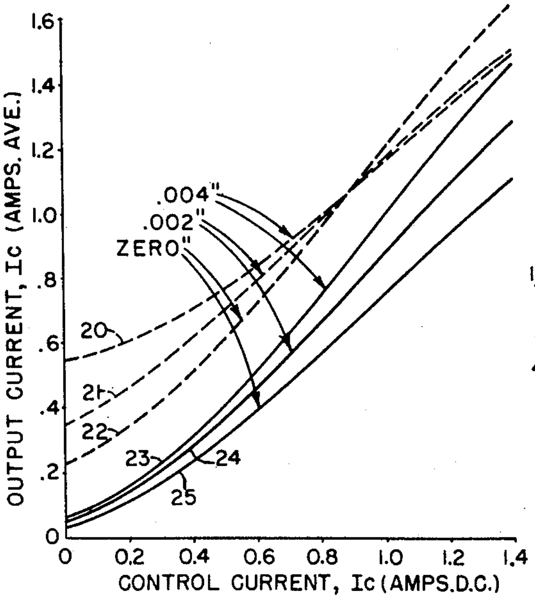
Fig. 4 shows a series of output current vs. control current curves both of a conventional magnetic amplifier and of a magnetic amplifier employing the present invention.

The advantage of coils 13 and 14 with respect to the performance of the magnetic amplifier is best shown by reference to Fig. 4 illustrating the control curves of a magnetic amplifier with various amounts of gaps in the cores with and without the additional winding of the present invention. The transfer characteristics shown in Fig. 4 are plotted for three nearly equivalent gaps; zero spacing, .002″ and .004″. The zero spacing, or butt joint, has an apparent spacing of .002″ including the magnetizing force for the core itself. Curve 20 is illustrative of a core having a .004″ air gap and as seen from the graph the no load current is in the order of .5 average amperes. Curve 23 is illustrative of the amplifier having a core with the same .004″ air gap but also having the present invention incorporated therein. It is readily seen from the comparison of curves 20 and 23 that by the incorporation of the present invention the quiescent current (magnetizing current) is reduced from the order of .5 to less than .1 average amperes. In a similar manner curves 21 and 24 are illustrative of cores having a .002″ air gap, curve 24 with a magnetic amplifier having the present invention incorporated therein to reduce the quiescent current from approximately .35 average amperes to approximately .05 average amperes. Again curves 22 and 25 are illustrative of a core having a zero gap (apparent .002″ gap) wherein the present invention reduces the quiescent current from .22 to .02.

In general the residual magnetizing current is almost completely cancelled. The fundamental frequency can be completely suppressed leaving only the harmonic components which may be somewhat suppressed if the reactance of inductance 12 is designed to duplicate the magnetization curve of the amplifier cores.

It may also be noted in Fig. 4 that the characteristic curves are straightened to more nearly conform to the type of curves ordinarily expected of the materials having a sharp break in their magnetization curves. In the conventional system amplifier gain decreases with the addition of air gaps; although the one to one ratio of control current versus output current is remarkably well preserved when the gap is kept small.

However, it may further be noted from Fig. 4 that the cancellation of the residual magnetizing currents by the present invention does not decrease the amplifier gain for a given gap but to the contrary the amplifier gain is increased.

An embodiment of the present invention constructed substantially as the amplifier of Fig. 3 produced the results shown in Fig. 4. In the constructed embodiment of Fig. 3 windings 2 and 3 have 400 turns each, windings 13 and 14, 40 turns each; inductance 12 nine times the inductance of windings 13 and 14; and control coils 8 and 9, 400 turns of No. 17 formvar wire. Hypersil type C-94 cores (0.007" laminations) with ½" x 1" cross section were used for cores 5 and 6. The knee of the saturation curve was reached at approximately 95 volts (R. M. S. 60 cycles).

Although certain preferred embodiments of the present invention are shown it is to be expressly understood that modifications may be made thereof without departing from the true spirit and scope of the invention.

The invention described herein may be manufactured and used by or for the Government of the United States of America for governmental purposes without the payment of any royalties thereon or therefor.

What is claimed is:

1. A magnetic amplifier comprising a pair of saturable magnetic cores having respective air-gaps therein, an alternating-current load winding and a direct current control winding wound on each of said cores, the load windings being connected in series and the control windings being connected in series opposition, a low inductance tertiary winding wound on each of said cores for reducing to a minimum the magnetizing current which flows through said load windings, said tertiary windings being connected in series and continuously energized during amplifier operation, and a relatively high inductance connected in series with said tertiary windings.

2. A magnetic amplifier comprising a pair of saturable magnetic cores having respective air-gaps therein, an alternating current load winding and a direct current control winding wound on each of said cores, the load windings being connected in series and the control windings being connected in series opposition, a tertiary winding wound on each of said cores, said tertiary windings being continuously energized during amplifier operation, and current control means coupled to said tertiary windings for maintaining the ampere-turns thereof substantially equal to the ampere-turns of said alternating-current load windings respectively.

3. A magnetic amplifier comprising a pair of saturable magnetic cores having respective air-gaps therein, and alternating-current load winding and a direct current control winding wound on each of said cores, the load windings being connected in series and the control windings being connected in series opposition, and means for reducing to a minimum the no load magnetizing current which flows through said alternating-current windings including a tertiary winding wound on each of said cores, said tertiary windings being connected in series and continuously energized during amplifier operation, and current control means coupled in series with said tertiary windings for limiting the ampere-turns thereof to a value substantially equal to the ampere-turns of said alternating-current windings at no load.

4. A magnetic amplifier comprising a pair of saturable magnetic cores having respective air-gaps therein, a plurality of windings wound on each of said cores, said plurality of windings consisting of an alternating-current load winding, a direct-current control winding and a tertiary winding, the load windings being connected in series and the control windings being connected in series opposition, the tertiary windings being connected in series and continuously energized during amplifier operation, and inductance means in series with said tertiary windings for limiting the ampere-turns thereof to a value substantially equal to the ampere-turns of said alternating-current windings at no load.

ROBERT A. RAMEY.

References Cited in the file of this patent

UNITED STATES PATENTS

| Number | Name | Date |
|---|---|---|
| 2,453,470 | Steinitz | Nov. 9, 1948 |
| 2,486,343 | Taylor | Oct. 25, 1949 |